INTERCONNECTING NETWORK FOR A TELECOMMUNICATION SYSTEM
Filed Oct. 17, 1960 4 Sheets-Sheet 1
FIG. 1.
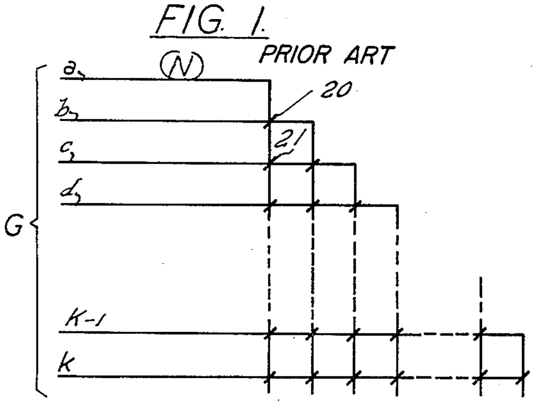
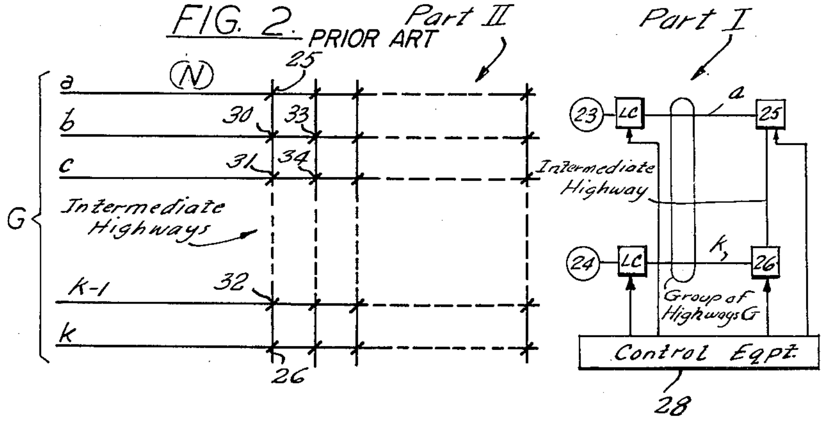
FIG. 2.
FIG. 7.
| | B=250 ERL. | | | | B=500 ERL. | | | |
|---|---|---|---|---|---|---|---|---|
| | G | S | X | Y | G | S | X | Y |
| FIG. 1 | 40 | 1 | 780 | 39 | 79 | 1 | 3081 | 78 |
| FIG. 2 | 40 | 1 | 600 | 68 | 80 | 1 | 2080 | 130 |
| FIG. 3 | 42 | 3 | 672 | 44 | 84 | 4 | 1932 | 65 |
| FIG. 4 | 49 | 7 | 343 | 19 | 100 | 10 | 1000 | 28 |
Inventor
H. H. ADELAAR
By [signature]
Agent Aug. 31, 1965 H. H. ADELAAR 3,204,033

INTERCONNECTING NETWORK FOR A TELECOMMUNICATION SYSTEM

Filed Oct. 17, 1960 4 Sheets-Sheet 2

Inventor
H.H.ADELAAR
By [signature]
Agent

INTERCONNECTING NETWORK FOR A TELECOMMUNICATION SYSTEM

Filed Oct. 17, 1960 4 Sheets-Sheet 3

Inventor
H.H.ADELAAR
By [signature]
Agent

INTERCONNECTING NETWORK FOR A TELECOMMUNICATION SYSTEM

Filed Oct. 17, 1960 4 Sheets-Sheet 4

Inventor
H.H.ADELAAR
By [signature]
Agent

United States Patent Office 3,204,033
Patented Aug. 31, 1965

3,204,033

INTERCONNECTING NETWORK FOR A TELECOMMUNICATION SYSTEM

Hans Helmut Adelaar, Antwerp, Belgium, assignor to International Standard Electric Corporation, New York, N.Y., a corporation of Delaware Filed Oct. 17, 1960, Ser. No. 63,203
Claims priority, application Netherlands, Oct. 20, 1959, 244,500
9 Claims. (Cl. 179—15)

The invention relates to an interconnecting network for a telecommunication system, e.g. an automatic telephone exchange, providing for the interconnection of a plurality of terminals, in which the terminals are divided into groups, each group of terminals being connected by means of a terminal selector switch to a group highway which is a time division multiplex link comprising N time channels numbered 1, . . ., N, each terminal having access to any channel of the associated group highway, and in which a connection between terminals of different groups utilizes the same-numbered channels on the respective group highways.

An interconnecting network of this nature is disclosed in U.S. Patent No. 2,910,540, issued to S. Van Mierlo and H. Adelaar, on October 27, 1959 and entitled Telecommunication System. In the system described by the above patent, the establishment of a new connection is unidirectional as in most classical telephone systems; each subscriber station is thus provided with two terminals, a primary and a secondary terminal; the substations are grouped, and the primary and secondary terminals of each group are respectively connected, by individual gates, to a primary and a secondary group highway. Each primary group highway is connected to every secondary group highway by a gating system constituting a group selector. A connection between the primary terminal of a substation to the secondary terminal of another substation is made over the corresponding group highways on any particular time channel found free on both highways.

The principles of the above patent are not restricted to the unidirectional mode of establishment of new connections. In time division multiplex telephony at the present time, it is common practice to establish new connections on a bidirectional basis, each subscriber station being provided with only one terminal. The interconnecting network realized in accordance with the above patent then reduces to a single set of group highways, each serving a group of terminals, and each connected, by interconnecting gates, to every other group highway.

For a network comprising G group highways, which are to be interconnected two by two, a total number of $$\frac{G(G-1)}{2}$$

interconnecting gates is required. The total number of group highways in a telephone exchange is proportional to the total traffic handled; the number of gates is thus proportional to the square of the traffic, and will be very considerable for a large exchange. It may further be remarked that the utilization factor of these gates is very low: a maximum of $$\frac{G}{2}$$

simultaneous connections, utilizing the same time channel, may be realized in the exchange, and thus the maximum utilization factor is of $$\frac{1}{G-1}$$

An interconnecting gate may best be constituted by a base-controlled, high-speed, symmetrical transistor, and is thus a relatively expensive element. As such, it is highly desirable to reduce the number of interconnecting gates to a minimum, and correlatively to utilize them with a maximum efficiency.

An object of the invention is to reduce appreciably the number of interconnecting gates required for an exchange of given traffic capacity.

Another unfavourable characteristic of the interconnecting network described above appears when considering a practical realization from the point of view of cross-talk. At the high frequencies involved in time division multiplex telephony, the reduction of cross-talk to a tolerable level constitutes a difficult problem. The cross-talk to be considered in relation with the interconnecting network is that originating in the coupling between independent speech paths, used in strict simultaneity, i.e. on the same time-channel.

Exterior to the gating network, the group highways are normally constituted by coaxial cable, which provides effective shielding of the independent speech paths. Within the gating network, each of G group highways is connected to G–1 interconnecting gates, each gate connecting two group highways. The use of coaxial cable within the gating network is impractical, and the shielding would in any case be imperfect as it would be interrupted at each connection to a gate.

A particularly attractive solution of this problem is provided in our copending Dutch patent application of even date and entitled "Crosspoint Network for a Time Division Multiplex Telecommunication System." This provides for the arrangement of the transistor gates in a compact matrix-like array, the group highways being materialized, within the gating network, by printed-wiring coordinates, with a common return or earth for all the highways. Crosstalk is maximum for adjacent parallel highways, and is due essentially to magnetic coupling, proportional to the length over which the speech paths run parallel within the gating network. For a given constructional design, the maximum length is determined by the number of gates to which each highway is connected: a crosstalk factor Y may be defined as equal to the length, counted in crosspoints, of the longest speech path in the network, to give an approximate measure of the crosstalk performance of the network. Thus $Y=G-1$.

For a large exchange comprising a large number of highways the level of crosstalk can be prohibitive. An object of the invention is to develop a novel highway interconnecting scheme in which the crosstalk is intrinsically at a much reduced level, for any given material design of the gating network.

The invention is characterized in this, that at least one partition of the group highways into sets is effected, a set containing one or more group highways, and constituting a supergroup with reference to the groups of terminals served by the group highways of the set, that a set of intermediate highways is associated to a partition in such a way that each intermediate highway serves to connect the group highways of one supergroup to the group highways of another supergroup and/or to connect the group highways within a supergroup, each intermediate highway being a time division multiplex link comprising N time channels and being connected via switching means to the group highways it serves, said partition(s) being so effected that the connection between any two terminals to be through-connected and belonging to different groups may be realized by means of at least one intermediate highway, said connection utilizing the same time channel on the respective group highways and on the intermediate highway.

The invention is further characterized in that said intermediate highways are further divided into two sets, of which the preferred set is such that, for the interconnection of any pair of group highways intervening in a conversational connection, as opposed to connections to signalling devices or to central exchange services, there is provided but a single intermediate highway of the preferred set, and that none of the intermediate highways which do not belong to the preferred set is identical in its connections to any intermediate highway of the preferred set.

A rapid and approximate treatment of a numerical example will put into evidence the remarkable saving in the number of interconnecting switches or gates brought about by the invention. Consider a large exchange comprising 100 group highways. The number of gates required for their interconnection two by two is $$x_2=\frac{100\times 99}{2}=4950$$

According to the invention, 10 supergroups each of 10 group highways may be constituted; with but a single intermediate highway per supergroup interconnection the supergroups will thus be interconnected by $$\frac{10\times 9}{2}=45$$

intermediate highways, to which must be added 10 intermediate highways, one per supergroup, for connections within a supergroup, so that the total number of intermediate highways is of 55. It may be appreciated that this number is adequate for the traffic offered by 100 group highways, since the group highways carry both originating and terminating traffic, i.e. twice the traffic existing on the intermediate highways. An inter-supergroup highway is connected to $2\times 10=20$ gates, while an intra-supergroup highway is connected to 10 gates. The total number thus required is $$X_3=(45\times 20)+(10\times 10)=1000 \text{ gates}$$

In comparison with the known arrangement the invention would thus reduce the number of gates in the ratio of 1 to 5, and increase the maximum utilization factor of each gate from $1/99\approx 1\%$ to 10% (since in the invention two interconnecting gates intervene in the realization of a connection instead of one in the known arrangements).

The above estimations are merely indicative since they do not take into account certain essential considerations on traffic. The complete mathematical analysis, as made later in the detailed description of the invention, shows that surprisingly the invention introduces only a slightly greater probability of blocking, due to the requirement of a three-channel "alignment" instead of a two-channel "alignment." (By "alignment" is designated the necessity of using the same-numbered channels on the highways intervening in a connection.) Thus for the same traffic, and the same grade of service, the invention requires a slight increase in the number of group highways and thus also in the number of interconnecting gates. The exact theoretical relation between the number of gates $X_3$ required by the invention, and that $X_2$ required by the known arrangement, comprising $G_2$ group highways of 25 channels each, is given, in function of $G_2$, and for equal traffic and a blocking probability of 0.01 by:

$$\frac{X_3}{X_2}=\frac{2.76}{\sqrt{G_2}}\,\frac{1}{1-\frac{1}{G_2}}$$

In the case of the example, where $G_2=100$, $X_3/X_2=0.28$, i.e. the invention reduces the number of gates in the ratio of 2 to 7; if the number of group highways $G_2$ considered is reduced to 50, the reduction if still in the ratio of 2 to 5.

The improvement brought about the invention as regards crosstalk will also be put into evidence with the aid of the above example. The crosstalk factor for the known arrangement is $Y=G-1=99$. According to the invention, each group highway is connected to 9 inter-supergroup highways, and each of the latter to 20 group highways: the longest speech path corresponds to $Y=2\times 9+20-2=36$ gates. Moreover, it will be shown in the detailed description that there exists an optimum solution by which the longest speech path may be reduced to 28 gates. For a given mode of construction, the degree of crosstalk is thus reduced by the invention in the proportion of 28 to 99, thus roughly to three-tenths.

It may be noted that the utilization of two switching stages and of an intermediate highway to interconnect the group highways is already known in the art. In my copending application, Serial No. 794,130, filed February 1959, now abandoned, and particularly FIG. 4 is disclosed a system in which a connection between two group highways (no distinction need be made in that patent application between group highways and junction highways insofar as the interconnecting network is concerned) is made over two gates by means of a multiplex link designated "intergroup highway," functionally analogous to the intermediate highway of the present invention. There is however no partition of the highways into sets to constitute supergroups of terminals.

Belgian Patent No. 558,096, issued December 5, 1954, to E. P. G. Wright et al. discloses the principle of speech storage whereby information may be transferred from one channel to another in a time division multiplex system. A speech storage device may be constituted by a condenser associated to a gating element, which may be charged by the amplitude-modulated pulses on a first time channel, and discharged on a second channel. As it is generally undesirable to have to simultaneously unblock two terminal gates connected to the same highway, use will be made of such speech storage devices for the realization of intra-group connections, i.e. connections between terminals connected to the same group highway: the basic arrangement provides a number of speech storage units connected to each group highway. On FIG. 3 of the above cited Belgian patient a more complex arrangement is shown, corresponding to the use of speech storage for all connections, inter-group as well as intra-group connections: To each group highway corresponds a multiplex link designated "inter-group link" connecting that group highway to a number of speech storage units, and connected to all the remaining group highways. (It may be noted that this structural arrangement is quite similar to that disclosed in noted copending U.S. application.) For the purpose of intra-group connections, the inter-group link merely prolongs the corresponding group highway.

These arrangements present the inconvenience that, for intra-group connections, to each group highway must be associated at least one speech storage unit, and that this speech storage unit has exclusive access to that highway only.

A further object of the invention is to provide for a more efficient use of the speech storage units in the exchange, and for a reduction in their number.

The invention is further characterized in that speech storage devices are used to provide, over two distinct time channels, connections between terminals belonging to the same group, and thus served by the same group highway, and in that any of said speech storage devices may be connected over a time division multiplex link and a switching element to any of the group highways serving at least one first order supergroup of terminals affected to local subscribers.

For an exchange comprising 100 group highways, at least 100 speech storage units are required by the known arrangement. Of the 1250 simultaneous connections that can at most be accommodated by the exchange, if a 25-channel multiplex system is used, one in a hundred will be an intra-group connection. Thus, if, as according to the invention, the speech storage units provided are available to all the group highways, only 13 such units are required. A nearly tenfold saving is obtained.

The above mentioned and other objects and characteristics of the invention, and the best manner of attaining them will be better understood from the following detailed description of embodiments to be read in conjunction with the accompanying drawings which represent:

FIG. 1, a highway interconnecting network in accordance with U.S. Patent No. 2,910,540, issued October 1959 to S. Van Mierlo et al.

FIG. 2, a highway interconnecting network disclosed the noted copending U.S. application Serial No. 794,130.

FIG. 3, a highway interconnecting network in accordance with the invention;

FIG. 4, an improved highway interconnecting network in accordance with the invention;

FIG. 5, a physical connection scheme for the networks of FIGS. 3 and 4;

FIG. 6, an improved physical connection scheme for the networks of FIGS. 3 and 4.

FIG. 7 is an explanatory table providing a comparison between the networks of FIGS. 1, 2, 3 and 4.

FIG. 8, a more fully elaborated highway interconnecting network, for a 10,000-line telephone exchange with junctions towards other exchanges, realized according to the invention;

*Brief description*

First let us examine the objectives of the invention. Briefly stated, the invention provides a switching network configuration for (a) Minimizing the number of voice gates, crosspoints, or other switching equipment required to extend paths through a switching network, and (b) Reducing crosstalk by making the crosstalk of all possible paths equal and minimum (as distinguished from prior systems where crossstalk varied from path to path and voice gates had to be designed to cope with the most unfavorable requirements).

Later in this text, for mathematical computation, it will be convenient to refer to the number of gates as "X" and the crosstalk as "Y." Thus, to restate the objectives mathematically, the invention provides equipment which distributes telephone traffic in a manner where both X and Y are a minimum value.

Logically, the following text advances step by step from a description of a very simple, prior-art switching configuration (FIG. 1) to a description of an advanced switching configuration (FIG. 4) making full use of the principles of the invention. Other higher numbered figures apply the principles of FIG. 4 to specific systems.

The simplest switching configuration (FIG. 1) shows a group of highways interconnected on a full availability basis. Thus, highway *a*, for example, folds and crosses every other highway. If a connection to highway *b* is required, voice gate 20 closes. To inter-connect highways *a* and *c*, voice gate 21 closes. Highway *b* folds and crosses highways *c* to *k*—there is no need to cross *a* since voice gate 20 provides that function. In like manner every other highway folds and crosses all remaining highways with a voice gate at every intersection. The FIG. 1 network makes no effort to minimize voice gates; quite the contrary, it is very extravagant because full availability switching is not required.

The next most simple system (FIG. 2) provides percentage switching. Here we show a number of lines 23, 24 connected to one end of any two (*a, k*) voice highways of group G via individually associated line circuits LC. For the moment, we do not care whether the lines are trunk lines, subscriber lines, or some other kind of lines. Nor do we care what the highways are. They could be wire lines or time division multiplex highways. The distant ends of the highways terminate at voice gates or crosspoints 25, 26 which close to interconnect the highways *a, k* via an intermediate highway. Calls are extended through the system under the control of any suitable control equipment 28.

By inspection of the drawing, it is apparent that only the two voice gates 25, 26 are required to complete the *a* to *k* connection in the simple system of FIG. 2. However, the voice signals also pass through three additional, open or unoperated voice gates 30–32 (FIG. 2, Part II). During other calls, other highways in group G may gain access to each other through these and similar gates. For example, highways *b, c* may be interconnected via gates 33, 34, while highways *a, k* are connected via gates 25, 26. Since calls may extend through each of these and the other unoperated voice gates, each unoperated gate is a potential source of crosstalk. Thus, in the assumed example, gates 30, 31 are sources of crosstalk between the *a, k* and *b, c* highways.

If the network of FIG. 1 is rearranged as shown in FIG. 2, the required number of voice gates goes down, but the crosstalk goes up. FIG. 7 shows that, with a traffic of 250 Erlangs, the FIG. 1 network requires 780 voice gates (at a crosstalk factor of 39) while the FIG. 2 network requires 600 voice gates (at a crosstalk factor of 68). With a traffic of 500 Erlangs, the FIG. 1 network requires 3,081 voice gates at a crosstalk factor of 78 while the FIG. 2 network requires 2,080 voice gates at a crosstalk factor of 130. Thus, the prior art presents a dichotomy which requires a sacrifice of either voice gate minimization or crosstalk isolation.

According to one aspect of the invention, the configuration of the FIG. 2 network is rearranged as shown in FIG. 3. Voice highway group G is divided into S number of super groups, each having *G/S* number of highways. Here the group of intermediate highways 40 provide voice paths between highway super groups 41, 42. Intermediate highway 43 provide voice paths within a single super group 41. The manner in which voice paths may be completed between all super groups will be apparent by an inspection of FIG. 3. From FIG. 7, it is seen that the FIG. 3 arrangement reduces the crosstalk somewhat, but at a slight sacrifice by which the number of voice gates is increased.

In FIG. 3, the highways are time division multiplex highways, each carrying N number of channels. The operation principle is that the control equipment 28 (FIG. 2) finds two aligned, idle channels on the voice highways G and then uses any idle intermediate highway channel to interconnect the idle aligned channels. The result is that a relatively large number of intermediate channels are required to insure a predetermined grade of service.

Finally, FIG. 4 shows a network which makes full use of the principles of the invention. The control equipment no longer interrogates the group of highways G to find the two, aligned idle channels. Rather, it interrogates the intermediate highways, to find one channel having access, at each of its ends, to an idle channel. When such an idle intermediate highway channel is found, there are three (not two) idle aligned channels. Only then is the call committed to any given channel. This causes a very efficient assignment of channels and use of voice gates. As shown by FIG. 7, 250 Erlangs of traffic require only 343 voice gates at a crosstalk factor of 19, and 500 Erlangs of traffic require 1000 voice gates at a crosstalk factor of 28. This is a startling and dramatic improvement over the requirements of the networks shown in the preceding figures.

From the electrical arrangement of FIG. 4, we turn to the physical arrangement of the voice gates. The principles of the physical arrangement are shown graphically in FIGS. 5, 6. Each figure contemplates a compact array of printed circuit cards carrying voice gates. The cards (shown by horizontal lines) are physically stacked with voice gates (the black dots) vertically aligned. If the printed cards are wired together as shown in FIG. 5 and if a voice highway on card level "1" must be connected to a highway on level "2," only two voice gates 50, 51 are used—the voice signals do not pass through any extraneous, unoperated voice gates. There is no crosstalk. On the other hand, if a FIG. 5 highway on card level "4" must be connected to a highway on card level "5," the voice signals pass through eight voice gates 52–59. These are the two gates 55, 56 required for a connection plus an additional six extraneous, crosstalk-producing voice gates 52–54, 57–59. Thus, even though some channels may be interconnected with no crosstalk, all voice gates must be engineered for the worst condition (i.e. six unoperated, extraneous gates).

If the intercard wiring shown in FIG. 5 is physically rearranged as shown in FIG. 6, the crosstalk factor is greatly reduced. Thus, a highway on card level "1" connects to a highway on level "2" via five voice gates 60–64. In like manner, a level "4" highway connects to a level "5" highway via five gates 65–69. By inspection, it will be seen that every connection involves five voice gates (the required two and three extraneous, unoperated gates). Hence the crosstalk design requirements of every gate may be relaxed considerably, (i.e. isolation is reduced from six to three extraneous gates in the FIGS. 5, 6 examples).

*Detailed description*

Figure 3:
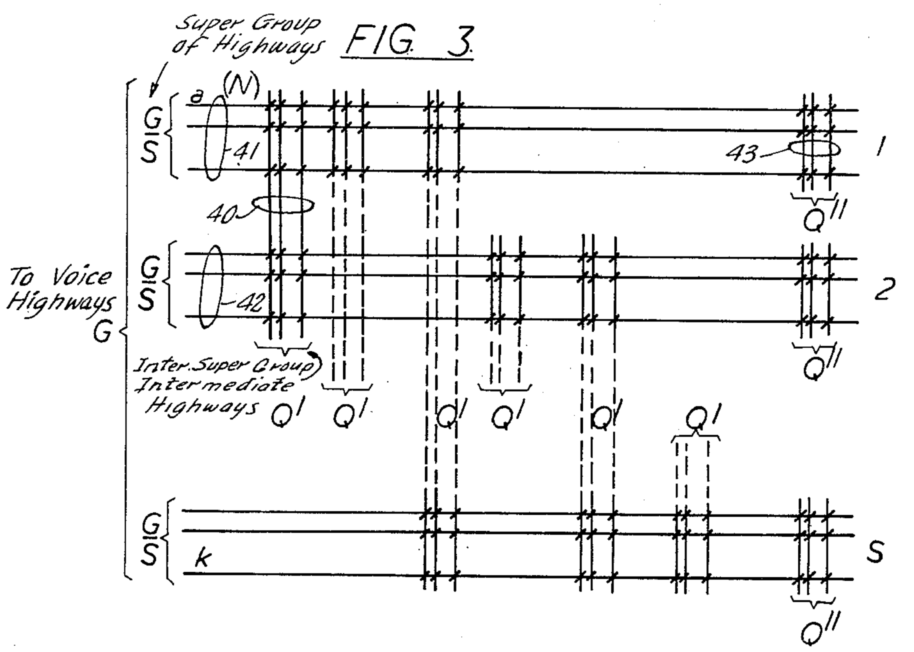

With the foregoing explanation of the invention philosophy in mind, it is thought that those skilled in the art will better appreciate the invention if the crosspoint requirements are set forth by a mathematical analysis.

At the present state of the art, it is possible to achieve substantially lossless transfer of signal energy in time division multiplex. The use of resonant transfer circuit, as disclosed in pending U.S. patent applications of K. Cattermole, Serial No. 550,163 filed November 30, 1955 and of K. Cattermole et al., Serial No. 663,704 filed June 5, 1957, allows for the suppression of all amplifying means within the interconnecting network of a telephone exchange. The cost of the interconnecting network is then determined essentially by the cost of the switching elements. These are most suitably constituted by high-speed, symmetrical transistors, used as base-controlled interconnecting gates to realize a pulsed connection between two multiplex links. The number X of interconnecting gates required in a network gives an immediate measure of the cost of the network.

Noise, and signal attenuation, constitute the essential performance criteria for any transmission network. The attentuation introduced by a saturated conducting transistor is negligible. However, in a time division multiplex telephony, with pulse durations of the order of the microsecond, thus with a useful frequency spectrum extending far into the high frequency range, noise in the form of undesirable coupling effects or crosstalk constitutes a fundamental problem. While the reduction of cross talk to an acceptable level depends essentially on the material assembly of the interconnecting network, for a given mode of assembly, the crosstalk performance is also determined by the general design of the network. A crosstalk factor Y, proportional to the degree of crosstalk, will be defined to provide a comparison between different types of networks.

There are two distinct categories of crosstalk: crosstalk between adjacent channels on the same highway, which, in a well designed system, depends only on the efficiency of the gate-control circuits and on the quality of the gates; and crosstalk between different highways, affecting connections utilizing the same time channel. Only the latter category, which depends on the material disposition and on the dimensions of the highway interconnecting network, will be considered here.

The physical layout of a highway interconnection network is the object of my noted copending Dutch patent application of even date, and entitled "Crosspoint Network for a Time Division Multiplex Telecommunication System." The actual gating network is constituted by one or more planes on which are disposed the transistor gates. Outside these interconnection planes, the highways can be constituted by coaxial cable, and are thus effectively shielded from one another. Within a plane, the use of coaxial cable presents considerable technical difficulties, and in any event, the shielding, interrupted at each point of connection to a gate, would necessarily be imperfect. A much more attractive design is that disclosed by our above copending patent application according to which the highways are materialized within a plane by printed wiring coordinates, with a common return. In both cases, magnetic coupling exists between adjacent highways, proportional to the length over which the highways run parallel to one another. With the printed wiring technique referred to above the existence of a common return conductor introduces a certain amount of conductive coupling between the different return current paths: The return conductor, ideally equipotential at earth, presents necessarily a certain non-negligible impedance, essentially inductive at the frequencies involved. The coupling is related to the ratio of the length of the desired return path to that of the undesired path. Thus, although there is no relation of proportionality, the length of the speech path here also gives a measure of the degree of crosstalk due to the conductive coupling. The maximum length of a speech path, for a given mode of construction of the gating network is proportional to the number of gates Y connected to the highways that intervene in the connection.

This number Y will be taken as the crosstalk factor; it gives a rough but easy means of comparison between two networks as to crosstalk performance: On the schematic representation of a network, the value of Y is directly read as the number of crosspoints on the longest possible speech path.

A comparison between the different interconnecting networks known from prior art and those disclosed by the invention may thus be made by calculating the values of X, the number of interconnecting gates required, and of Y, the crosstalk factor, corresponding to a precise numerical design problem. The design of the interconnecting network for a 25-channel time division multiplex telephone exchange, offering a grade of service of 0.01, will be worked out for a total originating traffic of 250 Erlang. The results will also be given for a traffic of double this volume, i.e. 500 Erlang.

FIG. 1 represents the speech-path network disclosed by U.S. Patent No. 2,910,540, for the case in which the establishment of new connections is bidirectional. Each group highway denoted $a, \ldots k$, is a time division multiplex link affording N time channels, and serves a group of terminals. The terminals are connected to the highway by means of individual gates, not represented. The G group highways are interconnected two by two by means of interconnecting gates represented as the crosspoints of a triangular matrix. A connection between two terminals belonging to different groups is made over the two corresponding group highways, and the corresponding crosspoint, on any one particular channel, attributed to this connection for the duration of the conversation.

To simplify the discussion, it will be supposed that no connections are to be made between terminals belonging to the same group. Such intra-group traffic in a large exchange represents only a small fraction of the total traffic. The influence of this hypothesis will be examined at the end of the description.

The network of FIG. 1 will be analyzed with respect to the total number X of interconnecting gates, and the cross-talk factor Y as defined above. Examination of FIG. 1 gives immediately $$X=\frac{G(F-1)}{2} \quad (1)$$

$$Y=G-1 \quad (2)$$

It remains to determine G in function of the grade of service P offered to the total exchange traffic B.

At the initial establishment of a connection it is necessary to realize a two-channel alignment, that is, to find a channel that is simultaneously free on both the highways that make up the connection. The full calculation of the blocking probability is to be found in the above cited S. Van Mierlo et al. application, the results of which will be quoted below:

For a large number of traffic sources offering at random a total traffic of A Erlang to the N channels of a highway, the Erlang formula gives a blocking probability of $$E_{N,A}=\frac{A^N}{N!F_N(A)}$$

where $$F_N(A)=\sum_{k=0}^{n}\frac{A^k}{k!} \qquad (3)$$

For two highways having respectively $x$ and $y$ channels engaged, the condition of channel alignment will introduce a loss if none of the $N-x$ free channels on the first highway corresponds to a free channel on the second highway. The total blocking probability, or grade of service, in a two-channel alignment system is given by:

$$P=(N+1-A)E_{N,A}+A(E_{N,A})^2$$

Relation (4) determines, for a given blocking probability, the average traffic A that may be offered to a highway.

If the total traffic offered to the exchange is of B Erlang, the group highways, since they carry both the originating and the terminating traffic, receive a traffic of 2B Erlang. The number of highways required is thus $$G=\frac{2B}{A} \qquad (5)$$

For the example to be considered, $N=25$, $P=0.01$ and $B=250$ Erlang. Thus (4), (5), (1) and (2) respectively give: $A=12.7$ Erlang, $G=40$, $X=780$, and $Y=39$.

The interconnecting network represented by FIG. 2 is that disclosed by the noted copending U.S. application, Serial No. 794,130. The G group highways are interconnected by means of L intergroup highways. This network comprises two switching stages. A connection between two group highways is made over two gates, represented as crosspoints, and the corresponding intergroup highway. The total number of interconnecting gates is $$X=LG \qquad (6)$$

The crosstalk factor Y, equal to the number of crosspoints on the longest speech path is:

$$Y=2L+G-2 \qquad (7)$$

At the initial establishment of a connection, having realized a two-channel alignment on the two group highways in accordance with the teaching of U.S. Patent No. 2,910,540, it is necessary to find an intergroup highway on which the selected channel is free. The blocking P within the exchange is thus made up of two distinct terms:

$$P=P_2+P' \qquad (8)$$

$P_2$ corresponds to the probability of not finding aligned channels on the two group highways, and is given by Equation (4); P′ is the independent probability that the channel selected on the two group highways is busy on all the L intergroup highways. It remains to evaluate P′.

The additional blocking P′ is the probability that out of the total of the $M=LN$ channels offered by the L intergroup highways of N channels each, L determined channels are busy. The remaining $M-L$ channels may be either free or engaged. Let $y$ represent the number of engaged channels. The probability of the event defined by a particular value of $y$ is $$P_{L+y}\frac{\binom{M-L}{y}}{\binom{M}{L+y}} \qquad (9)$$

$P_{L+y}$ being the probability, according to the Erlang distribution, of finding $L+y$ channels engaged, out of the M channels offered. The traffic on the intergroup highways, is equal to the total exchange traffic B. Thus $$P_{L+y}=\frac{B^{L+y}}{(L+y)!F_M(B)}$$

where $$F_M(B)=\sum_{i=0}^{M}\frac{B^i}{i!} \qquad (10)$$

The additional blocking is obtained by summation of the Expression (9) using (10), over all possible values of $y$, from $o$ to $M-L$:

$$P'=\sum_{y=o}^{M-L}P_{L+y}\frac{\binom{M-L}{y}}{\binom{M}{L+y}}=\frac{B^L(M-L)!}{M!F_M(B)}\sum_{y=o}^{M-L}\frac{B^y}{y!}=\frac{B^L(M-L)!F_{M-L}(B)}{M!F_M(B)} \qquad (11)$$

Equation (11) may further be simplified, provided that, as in the example, the number N of channels per highways is not too small. Then, both $M=LN$ and $$M-L=(L-1)N$$

are large numbers, and with a good approximation one has $$F_{M-L}(B)-F_M(B)\doteq e^B \qquad (12)$$

$$\frac{M!}{(M-L)!}=M(M-1)\ldots(M-L+1)\doteq\left(\frac{M}{2}+\frac{M-L+1}{2}\right)^L=(M-0.5L+0.5)^L \qquad (13)$$

whereby (11) becomes:

$$P'=\left(\frac{B}{NL-0.5L+0.5}\right)^L \qquad (14)$$

For the example: $N=25$, $P=P_2+P'=0.01$, $B=250$ Erlang. Equation (14) becomes:

$$P'=\left(\frac{250}{24.5L+0.5}\right)^L<0.01 \qquad (15)$$

Solving (15) the lowest admissible value of L is: $L=15$ for which value the additional blocking is of: $P'=0.0021$ Admissible $P_2$ is thus: $P_2=0.01-0.0021$: $P_2=0.0079$ For this value of $P_2$, Equation (4) gives a traffic capacity per group highway of: $A=12.45$ Erl.

By vitrue of (5), the number of group highways is then given by $G=40$. By virtue of (6) and (7) respectively, $X=600$ and $Y=68$.

It is quite clear that this constitutes an optimum solution: any increase in L to reduce the additional blocking P′ will not reduce G, the value of which is the same as that obtained for $P'=0$ (case of FIG. 1). The theoretical optimization of the number of interconnecting gates X would lead to a slightly lower value than above, but with solutions for L and G which are not whole numbers and which thus are meaningless. The arrangement of FIG. 2 as compared with FIG. 1 gives a reduction in the number of interconnecting gates of 25%, but the crosstalk, as measured by Y, is nearly doubled.

FIG. 3 represents an interconnecting network in accordance with the invention. A partition is made of the G group highways into S equal sets or supergroups of $G/S$ highways each. The S supergroups are fully interconnected two by two by a number of intermediate highways, Q′ inter-supergroup highways being provided for each interconnection. The interconnection of the group highways within each supergroup is assured by Q″ intra-supergroup highways for each supergroup.

The different highways are all time division multiplex links offering N time channels. A group highway serves a group of terminals (not represented on FIG. 3), each terminal being connected to the highway by means of individual terminal gates, also not shown. The ensemble of terminals served by a set of group highways is referred to as a "supergroup" of terminals: with reference to the group highways, the terms "set" or "supergroup" may be used interchangeably. The group highways are connected to the intermediate highways by means of interconnecting gates, represented on FIG. 3 as crosspoints. A connection between two terminals belonging to different groups (an "inter-group" connection) involves three multiplex links (the two group highways and one of the corresponding intermediate highway) and four gates (two terminal gates and two interconnecting gates). The connection is made by simultaneously opening the four gates on a recurrent time-position ("time-channel") arbitrarily assigned, out of the N time-positions available, to the connection for the duration of the communication.

A connection between two terminals belonging to the same group (an "intra-group" connection) cannot be made in this way. To simplify the analysis it will be supposed below that there are no such connections to be made; the consequences of this hypothesis will be examined at the end of the analysis. In practice, an intra-group connection will be made on two channels by means of a speech storage device, as exposed later in relation with FIG. 8.

The physical problem posed by the interconnection of G group highways to $$\frac{Q'S(S-1)}{2}+Q''S$$

intermediate highways (FIG. 3) may be given a particularly attractive solution by using an arrangement disclosed in our copending patent application of even date, entitled "Crosspoint network for a time division multiplex telecommunication system." Within the crosspoint network, the highways are realized as printed wiring coordinates isolated from one another and from a common ground return, each crosspoint effectively used for interconnection being equipped with a transistor interconnecting gate. Outside of the crosspoint network the highways are constituted by coaxial cable. A crosspoint network is thus realized according to an essentially plane arrangement and will be conveniently referred to as an "interconnecting plane".

A very significant advantage resulting from the division of the group highways into S supergroups resides in that to each supergroup can be connected to crosspoints mounted on a separate interconnecting plane: the S interconnecting planes thus provided will be stacked to give an extremely compact and convenient material arrangement for the interconnecting network.

Each interconnecting plane is thus constituted by a coordinate array of $G/S$ group highways and $$Q'(S-1)+Q''$$

intermediate highways. The $S-1$ sets of Q′ inter-supergroup highways of one plane are respectively extended by $S-1$ sets of Q′ coaxial cable lengths towards the $S-1$ other planes, while the Q″ inter-supergroup highways do not extend outside of a plane.

Figure 5:
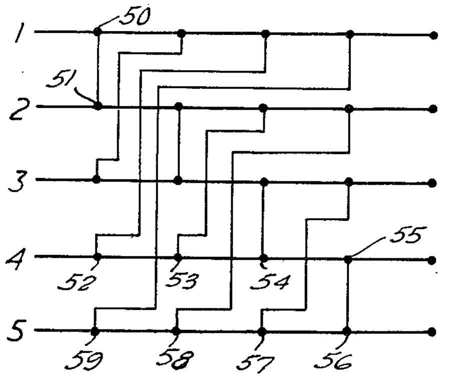
Figure 6:
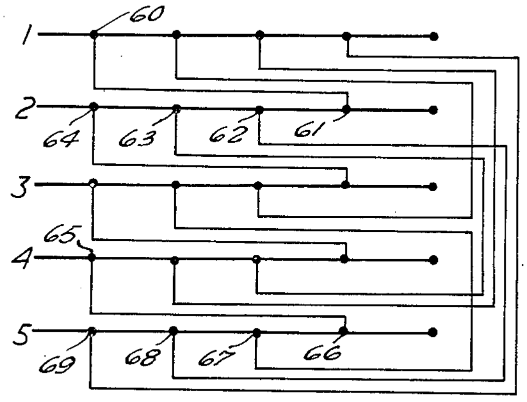

A schematic front-end representation of the stacked interconnecting planes is given by FIGS. 5 and 6, which differ as to the arrangement of the inter-supergroup highway coaxial cable connections. A stack of five planes is shown by way of example, the interconnecting planes being represented as the heavy horizontal lines 1–5. Each set of Q′ or Q″ intermediate highways is represented within the interconnecting plane as a small circle, and outside of the planes, each set of Q′ inter-supergroup highways is shown as a single line. The group highway coaxial cables are connected at the left-hand side of the interconnecting planes.

If FIG. 5 is read as a coordinate graph so that point $(p,q)$ represents the $q^{th}$ set (from left to right) of Q′ inter-supergroup highways on the $p^{th}$ plane (from top to bottom), the inter-supergroup highways are disposed in such a way that the connections satisfy the following relations:

$$\left.\begin{array}{l}(p,q)\text{ connected to }(q,p-1),\text{ if }p>q\\(p,q)\text{ connected to }(q+1,p),\text{ if }p<<q\end{array}\right\}\quad(16)$$

The Q″ intra-supergroups highways are disposed at the right of the last set of Q′ inter-supergroup highways. It may be noted that the inter-supergroup connections of FIG. 5 correspond to those indicated on FIG. 3.

The arrangement of FIG. 6 is such that the inter-supergroup connections satisfy the relation $$(p,q)\text{ connected to }([p+q]\bmod S,\ S-q)\quad(17)$$

which mod. S signifies modulo S.

The arrangement of FIG. 6 leads to a value of the crosstalk factor Y significantly smaller than that obtained with the arrangement of FIG. 5.

According to the disposition of FIG. 5, and for inter-supergroup connections, the longest speech paths, counted in interconnecting gates, intervene in connections between group highways of supergroups 4 and 5; more generally, between group highways of supergroups $S-1$ and S. Since an inter-supergroup highway is connected to $$\frac{2G}{S}$$

interconnecting gates, the longest speech path encounters a number of gates equal to:

$$2Q'(S-1)-2+\frac{2G}{S}\quad(18)$$

For intra-supergroup connections in the arrangement of FIG. 5, all supergroups are equivalent, and the longest speech path is of:

$$2Q'(S-1)+2Q''-2+\frac{G}{S}\quad(19)$$

gates. The crosstalk factor Y for the network of FIG. 3 arranged according to FIG. 5 is equal to the larger of the Expressions (18) and (19): thus $$Y=2Q'(S-1)-2+\frac{2G}{S}\text{ if }\frac{G}{S}>2Q''\quad(20)$$

$$Y=2Q'(S-1)+2Q''-2+\frac{G}{S}\text{ if }\frac{G}{S}<2Q''\quad(21)$$

The disposition of FIG. 6 is completely symmetrical: the length, in gates, of the longest speech path for any inter-supergroup connection is of $$Q'S-2+\frac{2G}{S}\quad(22)$$

while for any intra-supergroup connection, the length of the longest speech path is given as for FIG. 5 by (19). The crosstalk factor Y for the network of FIG. 3 arranged according to FIG. 6 is equal to the larger of the expressions (22) and (19): thus $$Y=Q'S-2+\frac{2G}{S}\text{ if }\frac{G}{S}>2Q''+Q'(S-2)\quad(23)$$

$$Y=2Q'(S-1)+2Q''-2+\frac{G}{S}\text{ if }\frac{G}{S}<2Q''+Q'(S-2)\quad(24)$$

From the results of the mathematical analysis of the network of FIG. 3, it will appear that in a practical design the condition of Equation (23)

$$\frac{G}{S}>2Q''+Q'(S-2)$$

is satisfied in a majority of cases, while the condition of Equation (20)

$$\frac{G}{S}>2Q''$$

is always satisfied. The disposition of FIG. 6, as against that of FIG 5, thus allows, for most practical designs, a reduction of the crosstalk factor of Q'(S−2). It may finally be noted that if the condition of Equation (23) is not satisfied, a reduction of the crosstalk factor may eventually be obtained simply by disposing the Q'' intra-supergroup highways at the left-hand or input side of the interconnecting planes, i.e. (for FIG. 6):

$$Y=Q'S-2+\frac{2G}{S}+2Q'' \text{ if } \frac{G}{S}<Q'(S-2) \qquad (25)$$

If the crosstalk factor Y depends on the material disposition of the intermediate highway connections for the network of FIG. 3, the total number X of interconnecting gates required by this network remains of course quite independent of such considerations. From this figure it may be seen quite simply that the total number of gates is of $$X=G[Q'(S-1)+Q''] \qquad (26)$$

At the initial establishment of a connection in the network of FIG. 3, one may proceed, as for the network of FIG. 2 with the realization of a two-channel alignment on the two group highways intervening in the connection, and then find, among the set of Q' or Q'' intermediate highways provided for the interconnection of these group highways, an intermediate highway on which the selected channel is free. As above, relation (8), the blocking is composed of two terms $$P=P_2+P' \qquad (8)$$

$P_2$, the blocking due to the two-channel alignment on the two group highways of N channels each, is given by Equation (4). P', the additional blocking, is given by an equation identical in form to (14):

$$P'=\left(\frac{C}{NQ-0.5Q+0.5}\right)^Q \qquad (27)$$

in which Q represents the number of intermediate highways available for each inter- or intra-set interconnection ($Q=Q'$ or Q''), and C the corresponding traffic ($C=C'$ or C'').

Traffic from one G.H. to any other G.H.:

$$\frac{B}{(G(G-1)}$$

to all the G.H. of another set:

$$\frac{B}{G(G-1)}\cdot\frac{G}{S}$$

G.H. of the same set:

$$\frac{B}{G(G-1)}\cdot\left(\frac{G}{S}-1\right)$$

(By hypothesis there is no intra-group highway traffic). Inter-set traffic between any 2 sets:

$$C'=\frac{B}{G(G-1)}\cdot\frac{G}{S}\cdot\frac{2G}{S}$$

Intra-set traffic for any one set:

$$C''=\frac{B}{G(G-1)}\cdot\frac{G-S}{S}\cdot\frac{G}{S}$$

Thus:

$$C'=\frac{2B}{S^2}\cdot\frac{G}{G-1} \qquad (28)$$

$$C''=\frac{B}{S^2}\cdot\frac{G-S}{G-1} \qquad (29)$$

For the example, $N=25$, $P=0.01$, $B=250$ Erlang. The design of the network of FIG. 3 is determined by Equations (4), (5), (8), (27), (28), (29) with the condition that X, given by (26) be rendered minimum.

An analytical approach to the design problem may be made by supposing that there is no intra-set traffic, and arbitrarily fixing $P_2$ and thus G; with only two parameters S and Q', it may be determined analytically that minimum X is obtained for $S=3$, for the numerical values given above. The real problem will be attacked by a trial and error method with S varying from 2 to 4. The results are summarized by the table below which is established as follows. For a given S, the only admissible values of G are those which are a multiple of S. For a given G, the traffic A per group highway is given by Equation (5). Equation (4) determines the corresponding value of $P_2$; the permissible additional blocking $P'_{max}$ is deduced from (8)! For a given S and G, Equations (28) and (29) provide C' and C''. Q' and Q'' are then chosen so that P', as determined by Equation (27) is inferior to $P'_{max}$. The number of interconnecting gates X required is deduced from Equation (26). The crosstalk factor Y pertains to the optimum arrangement of the network according to FIG. 6 and is given by (23) except for the case $S=4$ where Y is given by (24).

| S | G | A | $P_2'$ | $P'_{max}$ | C | Q' | P' | C'' | Q'' | P' | X | Y |
|---|---|---|---|---|---|---|---|---|---|---|---|---|
| 2 | 40 | 12.5 | 0.0083 | 0.0017 | 128 | 10 | 0.0015 | 61 | 7 | 0.0007 | 680 | 58 |
| 2 | 42 | 11.9 | 0.0047 | 0.0053 | 128 | 10 | 0.0015 | 61 | 6 | 0.0049 | 672 | 60 |
| 2 | 44 | 11.4 | 0.0028 | 0.0072 | 128 | 9 | 0.0072 | 61 | 6 | 0.0049 | 660 | 60 |
| 2 | 46 | 10.9 | 0.0015 | 0.0085 | 128 | 9 | 0.0072 | 61 | 6 | 0.0049 | 690 | 62 |
| 3 | 42 | 11.9 | 0.0047 | 0.0053 | 56.8 | 6 | 0.0033 | 26.4 | 4 | 0.0051 | 672 | 44 |
| 3 | 45 | 11.1 | 0.0020 | 0.0080 | 56.9 | 6 | 0.0033 | 26.5 | 4 | 0.0051 | 720 | 46 |
| 4 | 40 | 12.5 | 0.0083 | 0.0017 | 32.1 | 5 | 0.0012 | 14.5 | 4 | 0.0004 | 780 | 46 |

Inter-set traffic C' and intra-set traffic C'' may be evaluated as follows:

Total exchange traffic: B

Originating traffic per group highway (G.H.):

$$\frac{B}{G}$$

It appears from the table that the lowest value of X is obtained for $S=2$, $G=44$, the number of interconnecting gates being of $X=660$, while the crosstalk factor is $Y=60$. However, a much smaller value of Y can be attained at the cost of but a slight increase in the number of gates, for what may be considered as the optimum design:

$$S=3,\ G=42,\ X=672,\ Y=44(Q'=6,\ Q''=4)$$

It will be noted that both solutions are, with respect to the economy in the number of interconnecting gates, inferior to the design according to FIG. 2, which corresponds of course to the particular solution of FIG. 3 in which $S=1$. The division in sets according to FIG. 3 is advantageous only for larger exchanges. This appears in the table of FIG. 7, in the left-hand portion of which is given the comparison between the networks of FIGS. 1, 2 and 3 for the case studied above ($N=25$, $P=0.01$, $B=250$ Erlang), while in the right-hand position is given the same comparison for an exchange of twice the size, i.e. carrying a traffic of 500 Erlang. For this last traffic, the complete optimum design of the network of FIG. 3 using the arrangement of FIG. 6 corresponds to $S=4$, $G=84$, $Q'=6$, $Q''=5$, $X=1932$, $Y=65$.

Figure 4:
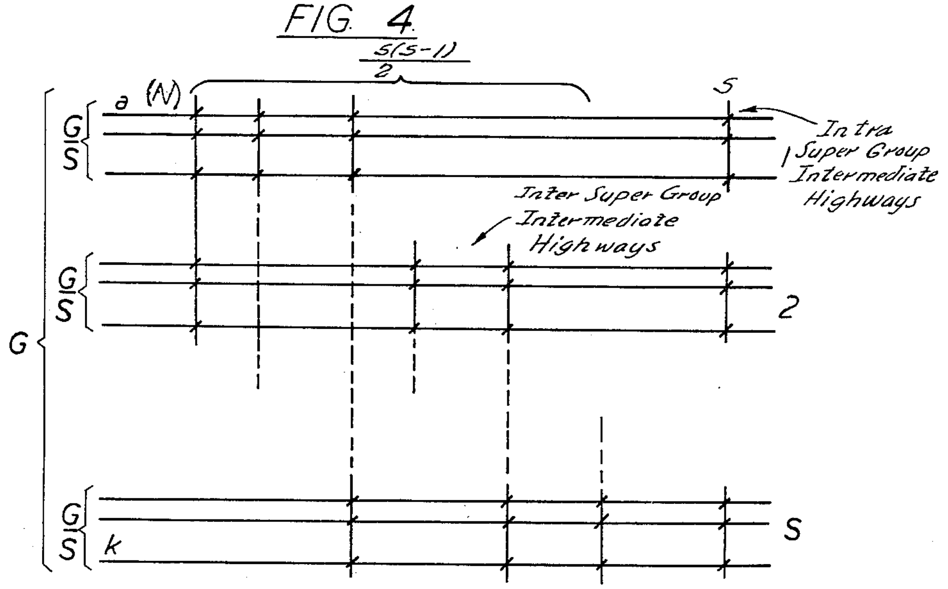

An improved interconnecting network is represented by FIG. 4. According to FIG. 4, the G group highways of the exchange, denoted $a, \ldots k$, are divided into S sets, numbered 1 to S, each set comprising an equal number $$\frac{G}{S}$$

of group highways, and corresponding to a supergroup of terminals. The S sets are fully interconnected two by two: however, only one inter-set highway is provided for each pair of sets to afford connection between any group highway of the first set to any group highway of the second set. And only one intraset highway is affected to each set for connections between group highways belonging to that set.

Thus, but a single intermediate highway is affected to the realization of any inter-set or intra-set connection. This arrangement is rendered possible by the following procedure for the establishment of new connections: the three highways involved in a new connection (two group highways and one intermediate highway) are simultaneously examined as to their state of channel occupation, and any of the channels simultaneously free on all three highways is seized for the connection. It will be shown that the three-channel alignment thus required introduces only a slightly greater probability of blocking than that arising from the two channel alignment.

A system particularly well adapted to the realization of a three channel alignment is described in a copending U.S. patent application of J. Masure, Serial No. 55,647, filed September 13, 1960, now U.S. Patent No. 3,158,689, entitled "System for determining and selecting free aligned telecommunication channels."

The procedure of three-channel alignment may eventually be applied to an arrangement such as that of FIG. 3, in which more than one intermediate highway is provided for each interset or intra-set connection.

The considerations as to the material disposition of the network of FIG. 4 are identical to those made with respect to the network of FIG. 3. Thus the intermediate highway connection schemes represented by FIGS. 5 and 6 apply integrally to the network of FIG. 4. The corresponding crosstalk factors are derived directly from relations (20) to (25) by putting in these equations $Q'=Q''=1$. Thus, for the arrangement of FIG. 5, from relation (20):

$$Y=2S-4+\frac{2G}{S} \tag{30}$$

Relation (21) becomes trivial since in all practical designs $$\frac{G}{S}>2$$

While for the improved arangement of FIG. 6, from (23) and (24) respectively:

$$Y=S-2+\frac{2G}{S} \text{ if } \frac{G}{S}>S \tag{31}$$

$$Y=2S-2+\frac{G}{S} \text{ if } \frac{G}{S}<S \tag{32}$$

Finally, if the intra-supergroup highways are disposed at the input side of the interconnecting planes in FIG. 6, from relation (25):

$$Y=S+\frac{2G}{S} \text{ if } \frac{G}{S}<S-2 \tag{33}$$

The design of the network of FIG. 4 may be optimized so as to render minimum, under given traffic conditions, the number X of interconnecting gates. Examination of FIG. 4 shows that $$X=GS \tag{34}$$

It will appear that the optimum design is such as to also minimize the crosstalk factor Y.

It will now be proceeded to the evaluation of the blocking introduced by the requirement of a three-channel alignment.

The blocking is the probability P that no channel can be found that is simultaneously free on the two group highways I and II and on the intermediate highway that are required to make up the new connection. The group highways carry a traffic of A Erlang and the intermediate highway C Erlang. The highways comprise N channels. It is supposed that the traffic on a highway obeys the Erlang distribution.

In order to determine the blocking P, the blocking $p(x)$ due to $x$ channels being engaged on group highway I will be calculated. P is then given by the sum of all probabilities $p(x)$ when $x$ goes through the series of integers between O and N.

The probability of $x$ channels being busy in group highway I is given, according to the Erlang formula, by $$P_x(A)=\frac{A^x}{x!F_N(A)}$$

where $$F_N(A)=\sum_{x=0}^{N}\frac{A^x}{x!} \tag{35}$$

If at the same instant $v$ arbitrary channels are busy on the intermediate highway the probability of this combined state is $P_x(A)$. $P_v(C)$, where $P_v(C)$ is of the same form as (35).

Supposing that out of these $v$ channels, $y$ channels are different from the $x$ busy in highway I whereas the remaining $v-y=i$ are coincident with some or all of these $x$ channels, the probability reduces to $$P_x(A)\cdot P_{y+i}(C)\,\frac{\binom{N-x}{y}\binom{x}{i}}{\binom{N}{y+i}}$$

where $i$ is any integer smaller than $x+1$.

In order to take into account all possible combinations for different values of $i$, this expression must be summed as follows:

$$P_x(A)\sum_{i=0}^{x} P_{y+i}(C)\,\frac{\binom{N-x}{y}\binom{x}{i}}{\binom{N}{y+i}}$$

This, therefore, represents the probability that, $x$ arbitrary channels being busy on group highway I, $y$ channels outside these $x$ are busy on the intermediate highway: blocking occurs if on group highway II the remaining $z=N-(x+y)$ channels are busy.

Supposing that $w$ channels on group highway II are engaged, the probability of which event is given by $P_w(A)$; and that out of these $w$ channels $j$ channels correspond to channels already engaged on group highway I and on the intermediate highway, the probability of this state is $$P_W(A)\frac{\binom{x+y}{j}}{\binom{N}{z+j}}$$

where $j$ is any number such that $j$ is smaller than $x+y+1$.

To consider all possible combinations for all values of $j$, the sum of this expression must be taken:

$$\sum_{j=0}^{x+y} P_{z+j}(A)\frac{\binom{x+y}{j}}{\binom{N}{z+j}}$$

Thus, the probability that blocking is due to the state where $x+y$ channels are busy on highway I and on the intermediate highway, and where the remaining channels are busy on highway II, is given by $$P_x(A)\sum_{i=0}^{x} P_{y+i}(C)\frac{\binom{N-x}{y}\binom{x}{i}}{\binom{N}{y+i}}\sum_{j=0}^{x+y} P_{z+j}(A)\frac{\binom{x+y}{j}}{\binom{N}{z+j}}$$

In order to obtain the blocking $p(x)$ due to the engagement of $x$ channels on group highway I, all possible combinations for the different values of $y$ must be considered. This yields.

$$p(x)=P_x(A)\sum_{y=0}^{N-n}\sum_{i=0}^{x} P_{y+i}(C)\frac{\binom{N-x}{y}\binom{x}{i}}{\binom{N}{y+i}}\sum_{j=0}^{x+y} P_{z+j}(A)\frac{\binom{x+y}{j}}{\binom{N}{z+j}}$$

and the blocking $$P=\sum_{x=0}^{N}p(x)$$

becomes $$P=\sum_{x=0}^{N}P_x(A)\sum_{y=0}^{N-x}\sum_{i=0}^{x} P_{y+i}(C)\frac{\binom{N-x}{y}\binom{x}{i}}{\binom{N}{y+i}}\sum_{j=0}^{x+y} P_{z+j}(A)\frac{\binom{x+y}{j}}{\binom{N}{z+j}} \quad (36)$$

Equation (36) may be put into a more convenient form: the combinatory terms are developed; expressions such as $P_{z+j}(A)$ are explicited according to relation (35); after regrouping, and with the introduction of the notation (3), one obtains the following expression of the blocking in a three-channel alignment system:

$$P=E_{N,A}\cdot E_{N,C}\sum_{x=0}^{N}\frac{P_x(A)}{P_x(C)}\sum_{y=0}^{N-x}\frac{\binom{N-x}{y}}{E_{x+y,A}}\sum_{i=0}^{x}P_i(C)\frac{P_{x-i}(C)}{P_{N-y-i}(A)} \quad (37)$$

In relation (37) C is the traffic on the intermediate highway. For the two classes of intermediate highways, interset and intra-set links, C will take respectively the values C′ or C″, which have already been evaluated by Equations (28) and (29), in which B is the total exchange originating traffic:

$$C'=\frac{2B}{S^2}\cdot\frac{G}{G-1} \quad (28)$$

$$C''=\frac{B}{S^2}\cdot\frac{G-S}{G-1} \quad (29)$$

Since C″ is approximately only one half of C′, it will be sufficient to evaluate Equation (37) for the value $C=C'$.

For a given value of the blocking P tolerated in the network, Equation (37) determines a relation between A and $C=C'$. For a given value of the traffic capacity A of the group highways, their number G is determined by the total exchange traffic B: since the group highways carry both the originating and the terminating traffic, $$G=\frac{2B}{A} \quad (5)$$

The design is completed by determining S, the number of super-groups according to Equation (28).

The optimum design is that which renders minimum the number X of interconnecting gates:

$$X=GS \quad (34)$$

It may be verified that the optimum design corresponds to a distribution of traffic as homogeneous as possible: the optimization condition is $$A=C' \quad (38)$$

In this case, Equation (37) becomes $$P=(E_{N,A})^2\sum_{x=0}^{N}\sum_{y=0}^{N-x}\frac{\binom{N-x}{y}}{E_{x+y,A}}\sum_{i=0}^{x}\frac{P_i(A)P_{x-i}(A)}{P_{N-y-i}(A)} \quad (39)$$

and provided that G as determined by (5) is fairly large, Equation (28) may be written, with a good approximation, $$S=\sqrt{\frac{2B}{A}}=\sqrt{G} \quad (40)$$

For this optimum design, the number of interconnecting gates is, from (34), $$X=S^3=\left(\frac{2B}{A}\right)^{3/2}=G^{3/2} \quad (41)$$

The crosstalk factor Y is, according to (30) and (31), for the arrangements of FIGS. 5 and 6 respectively, $$Y=4S-4 \quad (42)$$

$$Y=3S-2 \quad (43)$$

It may be observed that the division into sets according to (40) is such as to render Y minimum in both arrangements.

For the numerical example $N=25$, $P=0.01$, Equation (39) yields the solution: $A=10.25$ Erlang. Thereafter, for the two values of the traffic, $B=250$ and $B=500$ Erlang, the application of Formulae (5), (40), (41), and (43), the latter corresponding to the optimum arrangement of FIG. 6, yields for $B=250$ Erl.: $G=49$, $S=7$, $X=343$, $Y=19$; for $B=500$ Erl.: $G=100$, $S=10$, $X=1000$, $Y=28$.

The comparison of these results with those relative to the designs of FIGS. 1 and 2 is made in the table of FIG. 7. It brings out the remarkable results attained by designing on the basis of FIG. 4. For a total traffic of 250 Erlang, as for a traffic of 500 Erlang, the design of FIG. 4 allows for a relative economy in the number X of interconnecting gates of approximately 50% over the previous solutions, and an even greater reduction of the crosstalk factor.

A more general basis for the comparison of the invention with the network of FIG. 1 disclosed by the noted U.S. Patent No. 2,910,540 may be established as follows: For a given value of the blocking P, let $A_2$ and $A_3$ represent the traffic capacity of a group highway; $A_2$, for the two-channel alignment system of the patent, is determined by equation (4), $A_3$, for the three-channel alignment system of the invention, is determined by Equation (39). For a given traffic B, the number of interconnecting gates respectively required by the two systems are $$X_2=\frac{B}{A_2}\left(\frac{2B}{A_2}-1\right)$$

as derived from (1) and (5), and $$X_3\left(\frac{2B}{A_3}\right)^{3/2}, (41)$$

For 25-channel highways, and a blocking probability of $P=0.01$ one has $A_2=12.7$ Erlang, $A_3=10.25$ Erlang. With a good approximation, the relative reduction in the number of interconnecting gates is of:

$$\frac{X_3}{X_2}=\frac{6.95}{\sqrt{B}}=\frac{2.76}{\sqrt{G_2}} \quad (44)$$

where $G_2$ is the number of group highways corresponding to $X_2$. Similarly, the relative reduction of the crosstalk factor is given by:

$$\frac{Y_3}{Y_2}=\frac{8.4}{\sqrt{B}}=\frac{3.3}{\sqrt{G_2}} \quad (45)$$

$Y_3$ in relation (45) corresponds to the arrangement of FIG. 6. Formulae (44) and (45) are theoretical, since they do not express the condition that the number of group highways, and the number of supergroups, are necessary integral numbers.

It has been supposed throughout the above study that there is no intra-group traffic, that is, that there are no connections to be made between terminals served by the same group highway. For this hypothesis to be strictly valid in a comparative study, it is necessary that this intra-group traffic, a small fraction of the total traffic, be the same in the different networks considered. If the exchange traffic is of B erlang, intra-group traffic excluded, then to a second order approximation the intra-group traffic is of $$\frac{B}{G^2}$$

Erlang, where G is the number of group highways. The total exchange traffic is thus $$B+\frac{B}{G^2}$$

If, in comparing two networks comprising respectively $G_A$ and $G_B$ group highways, with $G_A$ smaller than $G_B$, the same intergroup traffic B is assumed, there will appear a difference in the total traffic carried of $$\frac{B}{G_A{}^2}-\frac{B}{G_B{}^2}$$

However for the numerical examples treated in the description, the relative difference $$\frac{1}{G_A{}^2}-\frac{1}{GG_B{}^2}$$

never exceeded 0.02% and is thus entirely negligible in a comparative study.

It should be noted that the traffic analysis made above supposes throughout that a channel is assigned at random to a connection. An appreciable reduction of the blocking probability may be attained simply by assigning the channels to the different connections to be established in a predetermined order; the channel selection system will then be operating on a "homing" principle. While no attempt has been made to perform the calculations corresponding to a homing system, its realization is relatively easy (see our pre-cited copending patent application: "System for determining and selecting free aligned telecommunication channels"). Indeed, it is the truly random selection system that is unfeasible in practice. Thus, a practical realization according to the design of FIG. 4 will yield better results with respect to blocking than that predicted by the above theory.

From a practical point of view, it should be mentioned that the design of FIG. 4 allows for a remarkably simple mode of highway indentification, which will considerably facilitate the organization of the control circuits of the exchange. Each group highway may be identified by two numbers: the number of its supergroup and its number within the supergroup. A distinct code for intermediate highway identification is then quite superfluous. Given the identities of two group highways, belonging either to the same or to different supergroups, in the first case, the identity of the intra-supergroup highway required for the connection is given by the supergroup number, while in the second case, the identity of the required inter-supergroup highway is also unequivocally given by the two supergroup numbers.

Figure 8:
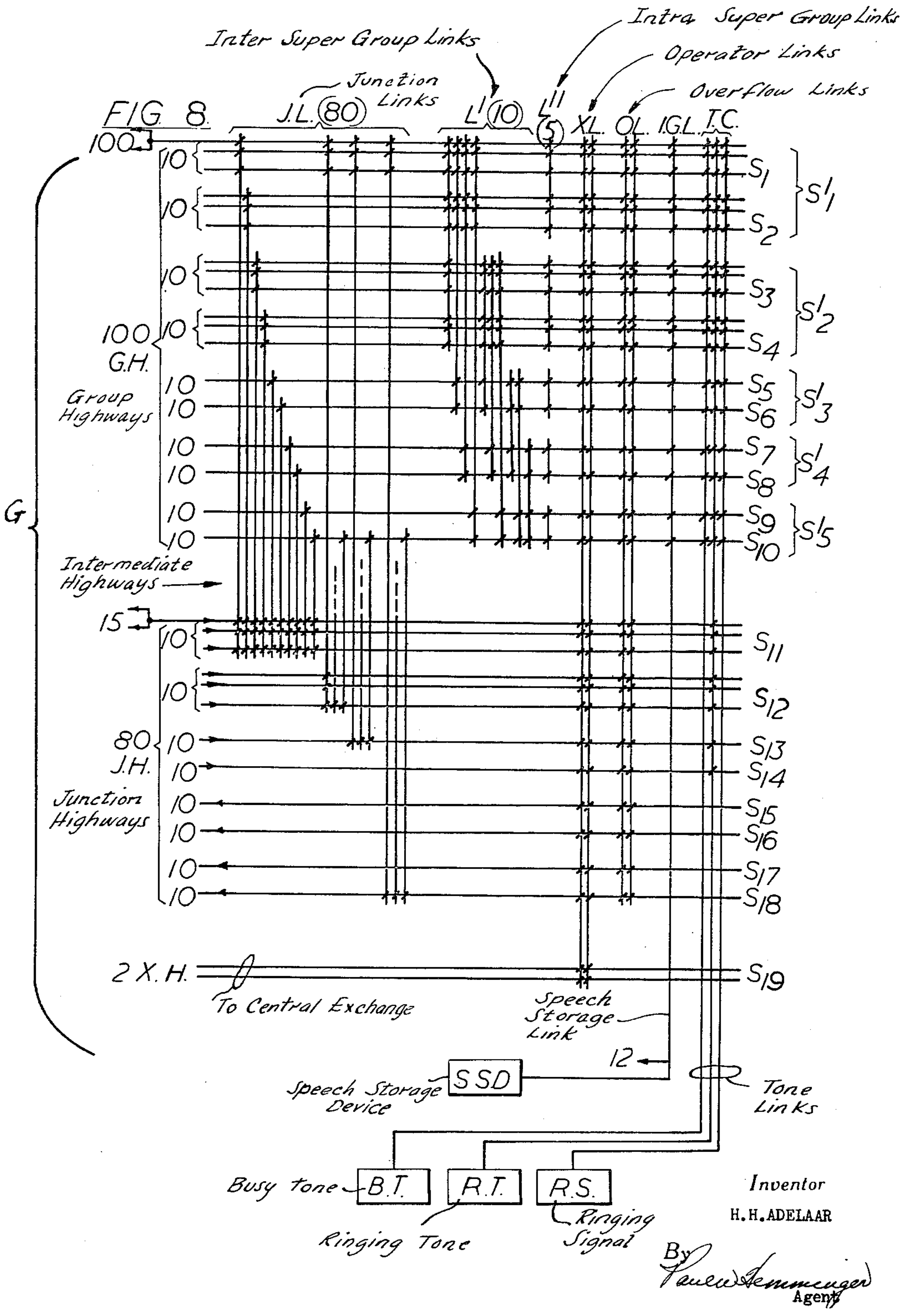

An example of a fully elaborated interconnection network developed from the basic design of FIG. 4 is given by FIG. 8. This design is relative to a 10,000 line exchange, with an originating traffic of 500 Erlang, 80% of which is junction traffic with other exchanges.

The network comprises 100 group highway (G.H.), each serving a group of 100 subscribers, and a total of 80 group highways (J.H.), each serving a group of 15 junctions, of which 40 serve incoming junctions, and 40 serve outgoing junctions. Furthermore, 2 group highways X.H. connected to central exchange services are provided. All highways are 25-channel time division multiplex links.

The group highways G.H. are divided into 10 supergroups $S_1$–$S_{10}$ of 10 G.H. each. The junction highways are similarly grouped by tens to constitute 8 supergroups $S_{11}$–$S_{18}$. The remaining group highways X.H. constitute a supergroup $S_{19}$. Each supergroup of the first set $S_1$–$S_{10}$ is connected separately to every supergroup of the second set $S_{11}$–$S_{18}$ by a single intermediate highway J.L. (junction link: 10×8=80 such highways J.L. are required. An intermediate highway is connected to all the group highways of the two supergroups it interconnects, by means of interconnecting gates represented as crosspoints. The logical organisation of the control circuits is such that a link J.L. is utilized only for connections to or from a junction highway, and is never used for connections within a supergroup $S_1$, for instance.

This constitutes a first and basic partition of the group highways of the exchange into supergroups. The supergroups thus defined are first-order supergroups and are of 10 group highways each, except for the supergroup constituted by the 2 group highways X.H., which latter are not connected in this partition to the other group highways.

A second partition is effected by grouping the supergroups $S_1$–$S_{10}$ in twos to constitute 5 supergroups of the second order $S'_1$–$S'_5$. The group highways in each of these second order supergroups are interconnected by a single intra-supergroup link L″. The supergroups $S'_1$–$S'_5$ are interconnected two by two by inter-supergroup highways L′, a single link L′ per interconnection.

The two sets of intermediate highways, J.L., and L′, L″, associated respectively to the two above partitions, constitute together the "preferred set" of intermediate highways: all conversational connections other than intra-group connections are normally made by means of these highways; for any given conversational connection, there exists but a single highway of this preferred set that can realize the connection.

The group highways X.H. of supergroup $S_{19}$ are affected to central exchange services such as operator service, or to signalling devices. They are connected to all highways G.H. and J.H. by means of two intermediate highways X.L.

All the highways G.H. and J.H. are further interconnected by means of two overflow links O.L. These overflow links duplicate any interconnection normally realized by a link J.L., L′, or L″, of the preferred set. An overflow link will be used to make up a connection only if the required link of the preferred set is unavailable due to blocking.

The intra-group traffic, that is, the traffic between lines belonging to the same group, is dealt with by means of an intra-group link I.G.L. connecting all the group highways G.H. to a number of speech storage devices S.S.D. As disclosed in Belgian Patent No. 558,096, E. P. G. Wright et al., such a device is essentially constituted by a capacitor, that is charged by the amplitude-modulated pulses on a first time channel, and discharged on a second channel. An intra-group connection, between lines 1 and 2 of group 5, for instance, will be made over G.H. 5 and I.G.L. and with the aid of a storage device, by connecting, on a first channel, line 1 to the storage condenser, and on a second channel, the storage condenser to line 2.

By providing one or more intra-group links I.G.L. for the realization of intra-group connections, the invention allows for the grouping of the speech storage units, which can thus be used in common for all the group highways G.H. of the exchange. With, as on FIG. 8, one 25-channel I.G.L., 12 co-existent intra-group connections may be realized, and thus 12 speech storage units are provided for the exchange. Further, one or more speech storage devices may be connected to the overflow link O.L., to allow also an "overflow" for intra-group connections.

The busy tone (B.T.), ringing tone (R.T.) and ringing signal (R.S.) generators are connected separately to all the group highways G.H. by corresponding tone connector links T.C. The ringing tone T.C. is also connected to all the incoming junction highways. The tone connector links are not time division multiplex links, but are links permanently connected to the corresponding tone generators. A required tone is connected to a subscriber simply by unblocking the line terminal gate and the appropriate interconnecting gate on a given channel free on the group highway.

For an exchange in which it is desired to handle tandem junction connections, the design of FIG. 8 will be completed by the adjunction of a number of tandem intermediate highways to interconnect incoming and outgoing junction highways J.H., each tandem highway interconnecting supergroups of the first or of a higher order.

A favourable material arrangement of the network of FIG. 8 from the point of view of the crosstalk, is that in which a separate interconnecting plane is effected to each first order supergroup of 10 group or junction highways. Provided that the crosstalk level is acceptable, any other material arrangement may be made to meet with particular construction design requirements e.g. two first order supergroups may be lodged on an interconnecting plane, thus increasing the crosstalk factor Y, or inversely, to decrease Y, two interconnecting planes may be attributed to a first order supergroup, with, in the latter case, two possibilities: either 5 group highways per interconnecting plane, or a repartition of the intermediate highways on the two planes. The intermediate highway connection arrangement will be made to correspond as closely as possible to the arrangement of FIG. 6.

A different type of interconnecting network may be elaborated according to the following principle. For facility, a purely local exchange will be considered. The group highways will be divided into supergroups according to two overlapping partitions, i.e. at least one supergroup of the first partition comprises group highways belonging to at least two distinct supergroups of the second partition and reciprocally. This arrangement, in which two partially separated interconnecting networks are thus provided, presents certain advantages from the point of view of maintenance.

While the principles of the invention have been described above in connection with specific apparatus and applications, it is to be clearly understood that this description is made only by way of example and not as a limitation on the scope of the invention.

I claim:

1. A time division multiplex network comprising a group of main communication highways divided into a number of super-groups of said main highways, means comprising a first plurality of intermediate highways for providing communication paths between the main highways in pairs of said super-groups, said first plurality of intermediate highways being restricted in number so that a single intermediate highway runs between each pair of said super-groups, there being enough of said first plurality of intermediate highways to make connections between each possible pair of said super-groups, and means comprising a second plurality of intermediate highways for providing communication paths between the main highways within said super-groups, the number of said second plurality of highways being equal to the number of said super-groups.

2. The time division multiplex network of claim 1 wherein said main highways are divided so that substantially all of said super-groups contain the same number of said main highways.

3. The network of claim 1 wherein each highway of said first plurality of intermediate highways extends between two of said super groups, said intermediate highways being arranged so that at least one highway extends between each of said super groups and every other super group to which access is required.

4. The network of claim 3 wherein at least some of said main highways are junction highways.

5. The network of claim 3 and means wherein each of said main and intermediate highways carries the same number of aligned channel time slots, and means for finding three idle aligned time slots on said highways before committing a call to any given one of said time slots, said three idle aligned time slots appearing on calling and called super group main highways and on an intermediate highway interconnecting said calling and called highways.

6. The network of claim 3 and means whereby each of said highways carries the same number of aligned time slots, and means for committing a call to a time slot only after finding an idle time slot on an intermediate highway interconnecting two of said super groups of highways.

7. The network of claim 1 wherein said highways comprise a plurality of voice gates distributed over a number of interconnecting planes, means for physically assembling said interconnecting planes into a compact array, and means for interconnecting the voice gates in a manner such that every possible connection from one super group main highway to every other super group main highway includes the same number of said voice gates.

8. The network of claim 1 and means comprising other of said intermediate highways for applying supervisory and control signals to any of said main highways.

9. The network of claim 1 and means comprising other of said intermediate highways for providing overflow link connections between said super group main highways.

(References on following page)

References Cited by the Examiner

UNITED STATES PATENTS

| | | | |
|---|---|---|---|
| 2,899,408 | 6/59 | Trousdale | 179—15 |
| 2,910,542 | 10/59 | Harris | 179—15 |
| 2,938,954 | 5/60 | Flowers et al. | 179—15 |

OTHER REFERENCES

Swiggett, Robert L., Introduction to Printed Circuits, Rider Publications, New York, 1956.

DAVID G. REDINBAUGH, *Primary Examiner.*

ROBERT H. ROSE, *Examiner.*